(12) United States Patent
Pogmore

(10) Patent No.: US 10,167,901 B2
(45) Date of Patent: Jan. 1, 2019

(54) BEARING ISOLATOR

(71) Applicant: Oliver Pogmore, Rotherham (GB)

(72) Inventor: Oliver Pogmore, Rotherham (GB)

(73) Assignee: AES Engineering Ltd., Rotherham (GB)

(*) Notice: Subject to any disclaimer, the term of this patent is extended or adjusted under 35 U.S.C. 154(b) by 0 days.

(21) Appl. No.: 15/579,260

(22) PCT Filed: Jun. 8, 2016

(86) PCT No.: PCT/GB2016/000116
§ 371 (c)(1),
(2) Date: Dec. 4, 2017

(87) PCT Pub. No.: WO2016/198823
PCT Pub. Date: Dec. 15, 2016

(65) Prior Publication Data
US 2018/0156276 A1 Jun. 7, 2018

(30) Foreign Application Priority Data
Jun. 8, 2015 (GB) .................................. 1509927.8

(51) Int. Cl.
*F16C 33/72* (2006.01)
*H02K 11/40* (2016.01)
*H02K 5/10* (2006.01)

(52) U.S. Cl.
CPC ............ *F16C 33/723* (2013.01); *F16C 33/72* (2013.01); *H02K 11/40* (2016.01); *H02K 5/10* (2013.01)

(58) Field of Classification Search
CPC ......... F16C 33/72; F16C 33/723; H02K 5/10; H02K 11/40
See application file for complete search history.

(56) References Cited

U.S. PATENT DOCUMENTS

| 7,857,321 | B2* | 12/2010 | Roddis | ................. F16J 15/4478 277/412 |
| 7,878,814 | B2* | 2/2011 | Chin | ...................... F16J 15/064 439/17 |
| 7,905,496 | B2* | 3/2011 | Roddis | ................. F16J 15/4478 277/425 |
| 2003/0057783 | A1* | 3/2003 | Melfi | ..................... H02K 11/01 310/68 R |
| 2004/0227299 | A1* | 11/2004 | Simmons | ............. F16J 15/3444 277/410 |

(Continued)

FOREIGN PATENT DOCUMENTS

| EP | 1523086 A1 | 4/2005 |
| GB | 2517452 A | 2/2015 |
| GB | 2519286 A | 4/2015 |

*Primary Examiner* — Alan B Waits
(74) *Attorney, Agent, or Firm* — Edwin D. Schindler

(57) ABSTRACT

A bearing isolator apparatus is for use in a piece of equipment which includes a rotatable shaft and a housing through which the shaft extends. The apparatus includes a static component for securing to the housing and a rotational component for securing to the shaft. A tortuous fluid path extends between the static component and the rotational component and a plurality of electrically conductive filaments extends between the static component and the rotational component, such that an electrical current can pass between the components. One or more conductive members electrically connect the rotor to the shaft.

14 Claims, 2 Drawing Sheets

(56) References Cited

U.S. PATENT DOCUMENTS

| | | | |
|---|---|---|---|
| 2006/0006602 A1* | 1/2006 | Roddis | F16J 15/3444 277/378 |
| 2010/0187946 A1* | 7/2010 | Orlowski | H01R 39/64 310/232 |
| 2011/0204734 A1* | 8/2011 | Orlowski | F16J 15/4478 310/85 |
| 2013/0099624 A1* | 4/2013 | Vicars | H01R 39/12 310/232 |
| 2013/0301971 A1* | 11/2013 | Cudrnak | F16C 33/76 384/477 |
| 2014/0051275 A1* | 2/2014 | Thomas | H01R 13/52 439/271 |
| 2014/0334758 A1* | 11/2014 | White | F16C 33/7843 384/477 |
| 2014/0352415 A1* | 12/2014 | Groenhuijzen | F02B 77/085 73/114.18 |
| 2014/0357120 A1* | 12/2014 | Blake | H01R 9/0521 439/583 |
| 2015/0033551 A1* | 2/2015 | Chastain | H01R 43/26 29/828 |
| 2015/0240869 A1* | 8/2015 | Dummert | F16C 33/74 378/133 |
| 2016/0312834 A1* | 10/2016 | White | F16C 41/002 |
| 2017/0108047 A1* | 4/2017 | White | F16C 19/52 |
| 2017/0125960 A1* | 5/2017 | Colverson | H02K 11/40 |
| 2017/0276179 A1* | 9/2017 | Hutchison | F16C 33/583 |

\* cited by examiner

# BEARING ISOLATOR

FIELD OF THE INVENTION

The present invention relates to bearing isolators and more particularly to electrical charge dissipating devices for rotating machinery. The invention is especially concerned with conductive labyrinth bearing protectors for directing electrostatic charge to ground.

BACKGROUND TO THE INVENTION

The increasing use of variable frequency drives (VFDs) within the electric motor industry as a consequence of energy conservation targets has caused a significant increase in stray voltage accumulation within shafts of rotating machinery.

VFDs regulate the speed of the motor by converting alternating current (AC) voltage to direct current (DC) voltage, then back to a pulse width modulated AC voltage of variable frequency. The voltage change relative to the time induces a form of capacitance between the motor stator and the rotor, which in turn induces a voltage on the rotating shaft. Once this shaft voltage builds up it will divert to ground through the path of least impedance, which with no grounding protection is nominally through the bearings.

When a large enough current passes through the bearings it will arc between the ball bearings and the races. In bearings which are operating properly, there is a micro gap with the ball bearings floating on a 'fluid film' of lubricating substance. Once the build up of voltage overcomes the dielectric capacity of this lubricant it will cross over this micro gap causing an electric discharge machining (EDM) effect on the outer race, thus damaging the bearings which will eventually ultimately require replacement.

Various methods of mitigating shaft voltage build up have been suggested including use of shielded cable, grounded shafts, insulated bearings, insulated grease and the installation of a Faraday shield within the motor. Shaft grounding methods might employ the use of brushes or bushes which contact the shaft. Brushes are to clusters of string filaments and bushes are a solid block components.

STATEMENTS OF THE INVENTION

According to the present invention, there is provided a bearing isolator device for use in a piece of equipment which includes a rotatable shaft and a housing through which the shaft extends, the device comprising:
 a static component for securing to the housing;
 a rotational component for securing to the shaft;
 a tortuous fluid path extending radially and axially between the static component and the rotational component;
 a plurality of electrically conductive filaments extending between the static component and the rotational component such that an electrical current can pass between said components; and
 one or more conductive members electrically connecting the rotor to the shaft.

Preferably, the conductive filaments are located in one of the stationary component and the rotational component such that on assembly the filaments are in contact with the other of the stationary and rotational components.

Preferably, the conductive filaments extend axially from an orifice in one of said components towards the other of said components. Preferably, the other of said components is provided with an axially extending contacting nib which makes contact with the conductive filaments.

Preferably, the conductive filaments are located in the stationary component and the contacting nib is provided on the rotational component.

The conductive filaments may be made of any suitable material and, preferably, they are made of a conductive carbon.

Preferably, filaments are bundled together in a brush located within a retaining orifice. Such an arrangement allows for cost effective assembly and minimises the potential for loss of parts or tampering.

Preferably, one or more conductive members include one or more conductive o rings.

The device may have a conductive dynamic o ring which is located between the rotary and stationary components.

The device may include a graphite sealing element between the rotary component and the shaft to provide a conductive path.

The device may further include an annular sealing member which has a first position in contact with both the static component and the rotational component and a second position in contact with either or both of the static component and the rotational component.

Preferably, the sealing device is assembled with the use of conductive grease, thereby promoting the current conduction.

Preferably, one of the rotational and stationary components is provided with a settling nib which, during assembly of the device, indicates the correct relative axial positioning of these components.

DETAILED DESCRIPTION OF THE INVENTION

The invention will now be described, by way of example only, with reference to the accompanying drawings.

Figure 1:
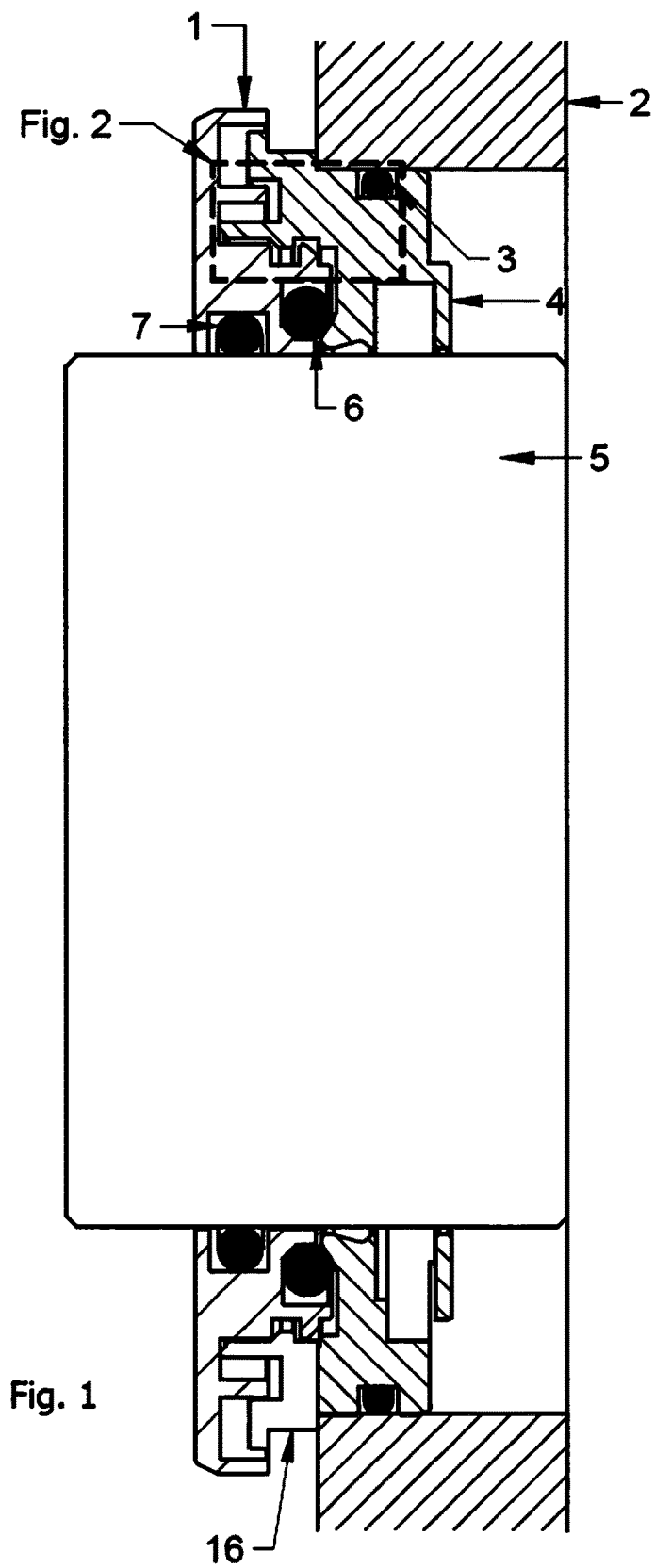
FIG. 1 is a longitudinal section of a grounded bearing isolator in accordance with the present invention.
Figure 2:
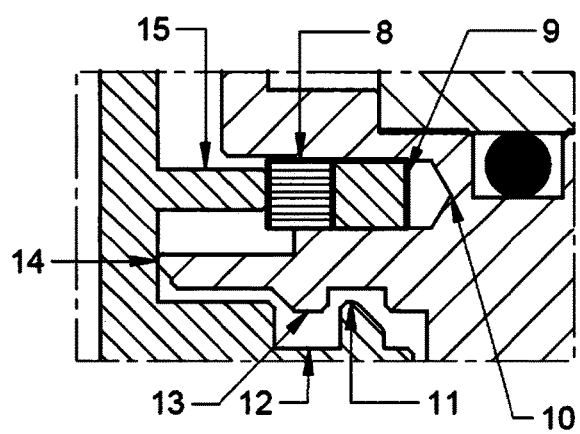
FIG. 2 is an enlarged view of part of the device of FIG. 1 detailing the grounding aspect of the design.
Figure 3:
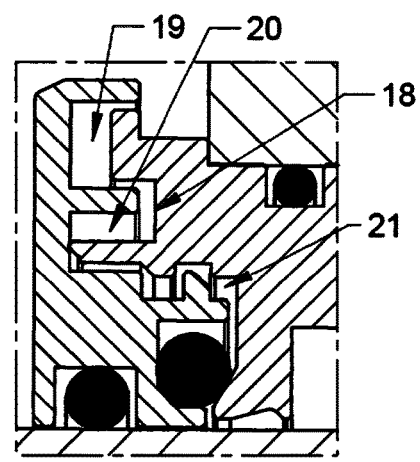
FIG. 3 is an enlarged view of part of the device of FIG. 1 seen along a different radial plane.

Referring to FIGS. 1 to 3 of the accompanying drawings, there is shown the stationary component 4 of a grounding labyrinth bearing protector which is located centrically around a shaft 5 and is a press fit into housing 2. A stationary o ring 3 aids in the fitment of the stationary component into the bore defined by the housing 2 and shaft 5. The rotational component 1 of the bearing protector is secured relative to the shaft 5 via a conductive rotary o ring 7. A tortuous or arduous path is formed between the stationary and rotational components, this path including gaps 19, 20 and 21 between the components. Also in the flow[path is a dynamic o ring 6 which, when the shaft 5 is stationary, completely seals the bearing chamber from atmosphere. During rotation of shaft 5, o ring 6 lifts allowing the bearing chamber to breath and expel air.

The stationary component 4 and rotational component 1 are electrically connected through the use of one or more conductive brush assemblies. The or each assembly comprises conductive filaments 8 which are fixed into an enclosing orifice such as drilled hole 10. The fixing within hole 10 may be by way of a conductive adhesive, indicated at 9.

The conductive filaments 8 are provided from a length of carbon cord, the end of which may be fed into hole 10 via a funnel. Once inserted the cord is cut to leave the appropriate length of the filaments protruding axially from hole 10.

The rotational component 1 is provided with an axially extending contacting nib 15 which contacts the conductive filaments 8.

The stationary component 4 is provided with an axially extending settling nib 14 which, during assembly of the device, axially and accurately positions the rotational and stationary components relative to each other, maintaining the arduous path therebetween. During operation, the tip of settling nib 14 becomes worn so that a gap is created between nib 14 rotational component 1. The creation of this gap eliminates any current conduction via the nib so that it takes place entirely via the brush assemblies.

The rotational component 1 is provided with an annular inclined protrusion 11 which, during assembly, makes an interference fit through contact with an opposing annular inclined protrusion 13 provided on stationary component 4.

Figure 4:
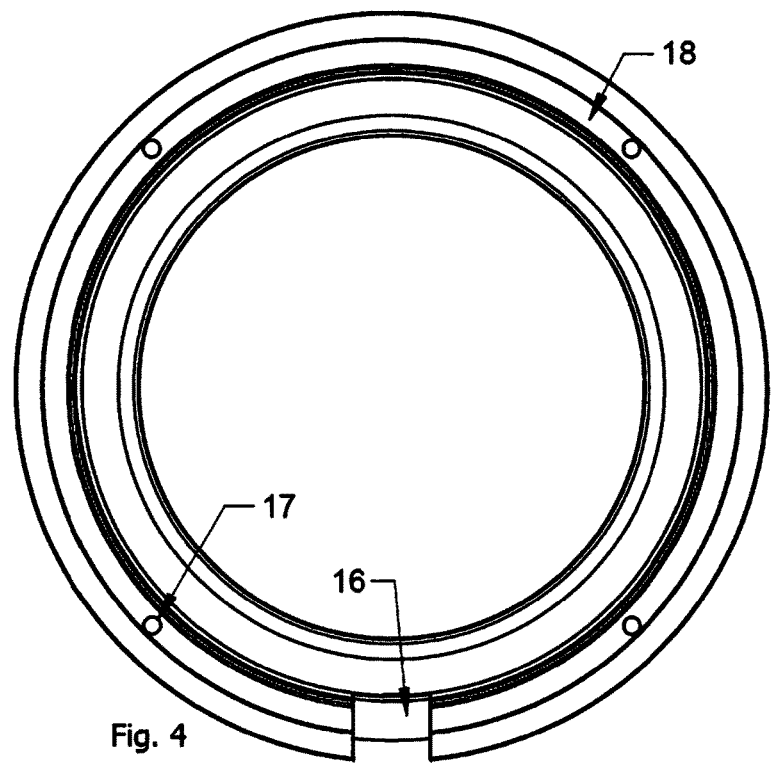
FIG. 4 is a front view of the stationary component.

Radially outwards facing annular groove 12, provided on rotational component 1, assists in the elimination of water/fluid ingress by allowing water/fluid to pool in the groove 12 and exit through an expulsion port 16 shown in FIG. 4.

Referring more particularly to FIG. 4, there is depicted a front view of the stationary face of stationary component 1 and the positioning in face groove 18 of orifices 17 (referred to as drilled holes 10 in FIG. 2) in each of which is located a brush assembly including brush filaments 8. There are four such orifices 17 arranged peripherally and equally spaced apart about the face groove 18.

The components of the above described bearing isolator may be made of any suitable materials. For instance, the rotational component 1 may be made of stainless steel and the rotational component 4 of phosphor bronze.

The invention claimed is:

1. A bearing isolator apparatus for use in a piece of equipment includes a rotatable shaft and a housing through which the shaft extends, said bearing isolator comprising:
   a static component for securing to the housing;
   a rotational component for securing to the shaft;
   a tortuous fluid path extending radially and axially between said static component and said rotational component;
   a plurality of electrically conductive filaments extending axially between said static component and said rotational component from an orifice in one of said static component and said rotational component towards the other of said rotational component and said static component, and said other of said rotational component and said static component includes an axially extending contacting nib making contact with said plurality of electrically conductive filaments for permitting an electrical current to pass between said static component and said rotational component; and,
   a conductive member electrically connecting said rotational component to the rotatable shaft of the piece of equipment.

2. The bearing isolator apparatus according to claim 1, further comprising an additional conductive member with said conductive member and said additional conductive member being located in one of said static component and said rotational component so that said plurality of electrically conductive filaments are in contact with the other of said static component and said rotational component.

3. The bearing isolator apparatus according to claim 1, wherein said plurality of electrically conductive filaments are located in the stationary component and the contacting nib is provided on the rotational component.

4. The bearing isolator apparatus according to claim 1, wherein said plurality of electrically conductive filaments are substantially made of conductive carbon.

5. The bearing isolator apparatus according to claim 1, wherein said plurality of electrically conductive filaments are bundled together in a brush located within a retaining orifice.

6. The bearing isolator apparatus according to claim 1, wherein said conductive member includes a conductive O-ring.

7. The bearing isolator apparatus according to claim 1, wherein one of said rotational component and said static component includes a settling nib contacting the other of said rotational component and said static component for providing a correct relative axial positioning of said rotational component and said static component during assembly.

8. A bearing isolator apparatus for use in a piece of equipment includes a rotatable shaft and a housing through which the shaft extends, said bearing isolator comprising:
   a static component for securing to the housing;
   a rotational component for securing to the shaft;
   a tortuous fluid path extending radially and axially between said static component and said rotational component;
   a plurality of electrically conductive filaments extending axially between said static component and said rotational component with one of said static component and said rotational component including an axially extending contacting nib making contact with said plurality of electrically conductive filaments for permitting an electrical current to pass between said static component and said rotational component; and,
   a conductive member electrically connecting said rotational component to the rotatable shaft of the piece of equipment.

9. The bearing isolator apparatus according to claim 8, further comprising an additional conductive member with said conductive member and said additional conductive member being located in one of said static component and said rotational component so that said plurality of electrically conductive filaments are in contact with the other of said static component and said rotational component.

10. The bearing isolator apparatus according to claim 8, wherein said plurality of electrically conductive filaments are located in the stationary component and the contacting nib is provided on the rotational component.

11. The bearing isolator apparatus according to claim 8, wherein said plurality of electrically conductive filaments are substantially made of conductive carbon.

12. The bearing isolator apparatus according to claim 8, wherein said plurality of electrically conductive filaments are bundled together in a brush located within a retaining orifice.

13. The bearing isolator apparatus according to claim 8, wherein said conductive member includes a conductive O-ring.

14. The bearing isolator apparatus according to claim 8, wherein one of said rotational component and said static component includes a settling nib contacting the other of said rotational component and said static component for providing a correct relative axial positioning of said rotational component and said static component during assembly.

* * * * *